United States Patent

[11] 3,616,948

| [72] | Inventors | Herman A. Imhof<br>Hamilton;<br>Thomas G. Brophy, Gloucester, both of Mass. |
|---|---|---|
| [21] | Appl. No. | 33,272 |
| [22] | Filed | Apr. 30, 1970 |
| [45] | Patented | Nov. 2, 1971 |
| [73] | Assignee | USM Corporation<br>Flemington, N.J. |

[54] ARTICLE SEPARATING MACHINES
6 Claims, 10 Drawing Figs.

[52] U.S. Cl. ..................................................... 214/6 DK,
198/31 AC, 214/1 BC
[51] Int. Cl. ...................................................... B65g 57/10,
B65g 60/00
[50] Field of Search ........................................... 214/6.5, 6
H, 6 K, 6 D, 6 M, 6 N, 1 BC, 1 BH, 8.5 F; 198/31
AC

[56] References Cited
UNITED STATES PATENTS

| 2,109,050 | 2/1938 | Quick et al. .................. | 214/6.5 UX |
| 3,194,126 | 7/1965 | Larsson ........................ | 214/6 D X |

FOREIGN PATENTS

| 1,016,134 | 1/1966 | Great Britain ................ | 214/6 FS |
| 6,615,675 | 5/1968 | Netherlands .................. | 214/6 DK |

*Primary Examiner*—Gerald M. Forlenza
*Assistant Examiner*—Robert J. Spar
*Attorneys*—Richard A. Wise, Richard B. Megley and Cornelius A. Cleary ABSTRACT: A machine for automatically taking articles from a single starting stack and depositing them on an alternate basis in two separate stacks. The machine includes means for advancing a single article from the starting stack cooperating with separating means, the latter constituting a pair of intercooperating, pivotable arms provided with article gripper heads and article stripping means located relative to separate stacking sites positioned effectively of the travel arc of each of the pivotable arms.

3,616,948

ARTICLE SEPARATING MACHINES

BACKGROUND AND GENERAL DESCRIPTION OF THE INVENTION

The present invention is directed to article separating machines and more specifically to a machine of that nature designed to alternately separate articles contained in a single stack into two separate stacks.

Articles designed for eventual paired use and having complementary shapes, are often cut, or died out together in a single operation and then separated prior to carrying on further operations with respect to them. This is quite general in the shoe and apparel industry where pairs including lefts and rights are produced in a single cutting operation and stacked as such as they come out of that operation. An outstanding example of this is in the production of shoes and particularly the operations involving production of shoe soles, outsoles and insoles by cutting from doubled sheets or blank materials. While this is a convenient method for cutting, giving for example, articles in pairs having identical shapes, it brings with it attendant difficulties in that the pairs must be separated for marking and further fabricating and working to provide them in final product, shoe, form. To date the separation operation has had to be carried out either as hand work or through use of complex machinery. Either way, the expense of separating pairs into individual articles has for the most part fairly neutralized any benefit obtained from the paired cutting operation.

Accordingly, it is an object of the present invention to provide a machine capable of automatically separating out individual articles from pairs of the same.

It is another object to provide a machine which is economically attractive in construction and operation, for automatically separating a stack of paired articles into individual stacks each constituted of articles all of one kind.

It is another object to provide a machine which is economically attractive in construction and operation, for alternately separating a stack of shoe parts, such as shoe soles into separate stacks.

These and other objects of the invention are attained in a machine adapted for automatic operation in alternately separating a stack of articles into separate stacks. The machine includes means for advancing a single article from the starting stack cooperating with separating means constituting a pair of reciprocally operable, intercooperating, pivotable arms carrying article gripper means, and article stripping means positioned in relation to separate stacking sites located effectively of the travel arc of each of the pivotable arms.

A feature of the invention includes article advancing means adapted to operate continuously and in each operational cycle advance a single article, the lowest in a stack of the articles, from the stack and into or between the jaws of one of a pair of cooperating gripper heads provided on a pair of pivotable arms which are operable to move between loading and discharge positions and in sequence with one another. The article advancing means is located relative to a support or table serving as a site for the starting stack and includes a slotted plate which is reciprocally movable along the longitudinal axis of the machine. On being advanced forward, the plate directs or pushes the lowest article in the starting stack out through a feed opening in a gate located forward of the starting stack site. The feed opening is adapted to have a heightwise dimension such that only a single article may be directed through the opening at one time or in one pass.

In another feature of the invention the intercooperating pair of pivotable arms are timed to operate in conjunction with operation of the article advancing means. The pivotable arms are located forward of the starting stacking site. They are further positioned so to have each operate in effect in the same plane as that in which the articles are advanced and at the same time to travel arcuately as to circumscribe an arc running effectively between a loading position located on the longitudinal axis of the machine along which the articles to be separated are advanced, and a point located laterally of that axis, and thereby define where the separate stacking sites, and similarly discharge positions, may be located. The pivotable arms may then be interconnected, as by a doubly pivoted bar to conveniently obtain interconnecting movement of the two, as well as allow them to be actuated from a single source, e.g. one arm can be powered and the other enslaved. The configuration result of the arms then is a pivotally reciprocable open parallelogram which is further elaborated by article gripper heads located at the forward ends of each of the arms. As one gripper head is advanced arcuately, to a loading or receiving position, that is, to receive an article being advanced along the longitudinal axis of the machine, the other gripper head is brought into a discharge or depositing position whereby the article then carried by that other head may be stripped off relative to and deposited on one of the separate stacking sites. Stripper rods are provided for that purpose which are located within the effective travel arc of each of the arms and similarly in reference with the separate stacking sites or discharge positions. Continuing that operation, the second gripper head is retracted arcuately to deposit the next article on a second separate stacking site or discharge position. Receiving and depositing of the articles is effected on an alternating basis.

GENERAL DESCRIPTION OF THE DRAWINGS

The following drawings are provided for the purpose of illustrating the invention, in which.

DETAILED DESCRIPTION OF THE DRAWINGS

Figure 1:
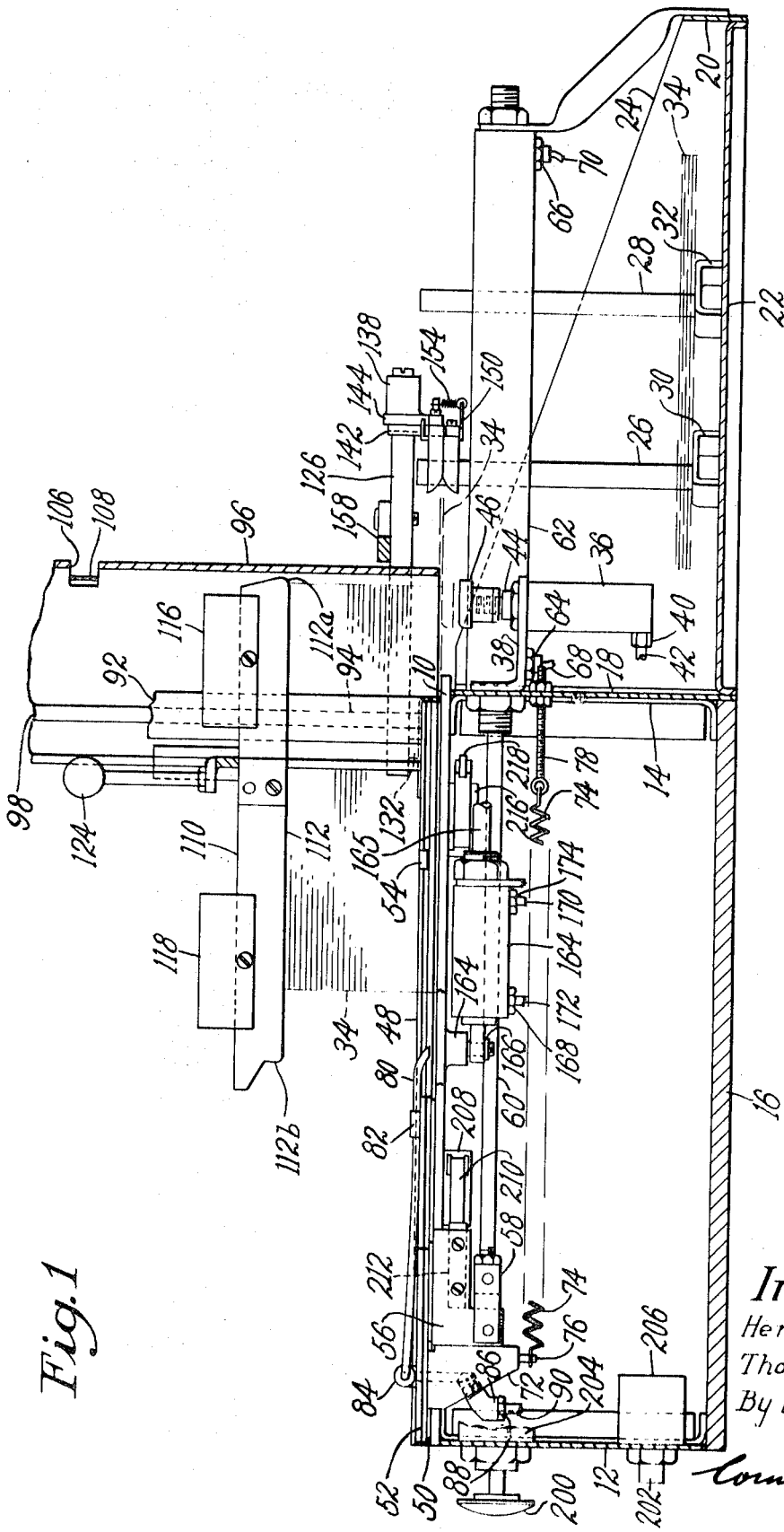
FIG. 1 is a partial front elevation, partly in section and with parts broken showing the article separating machine in the start position.
Figure 2:
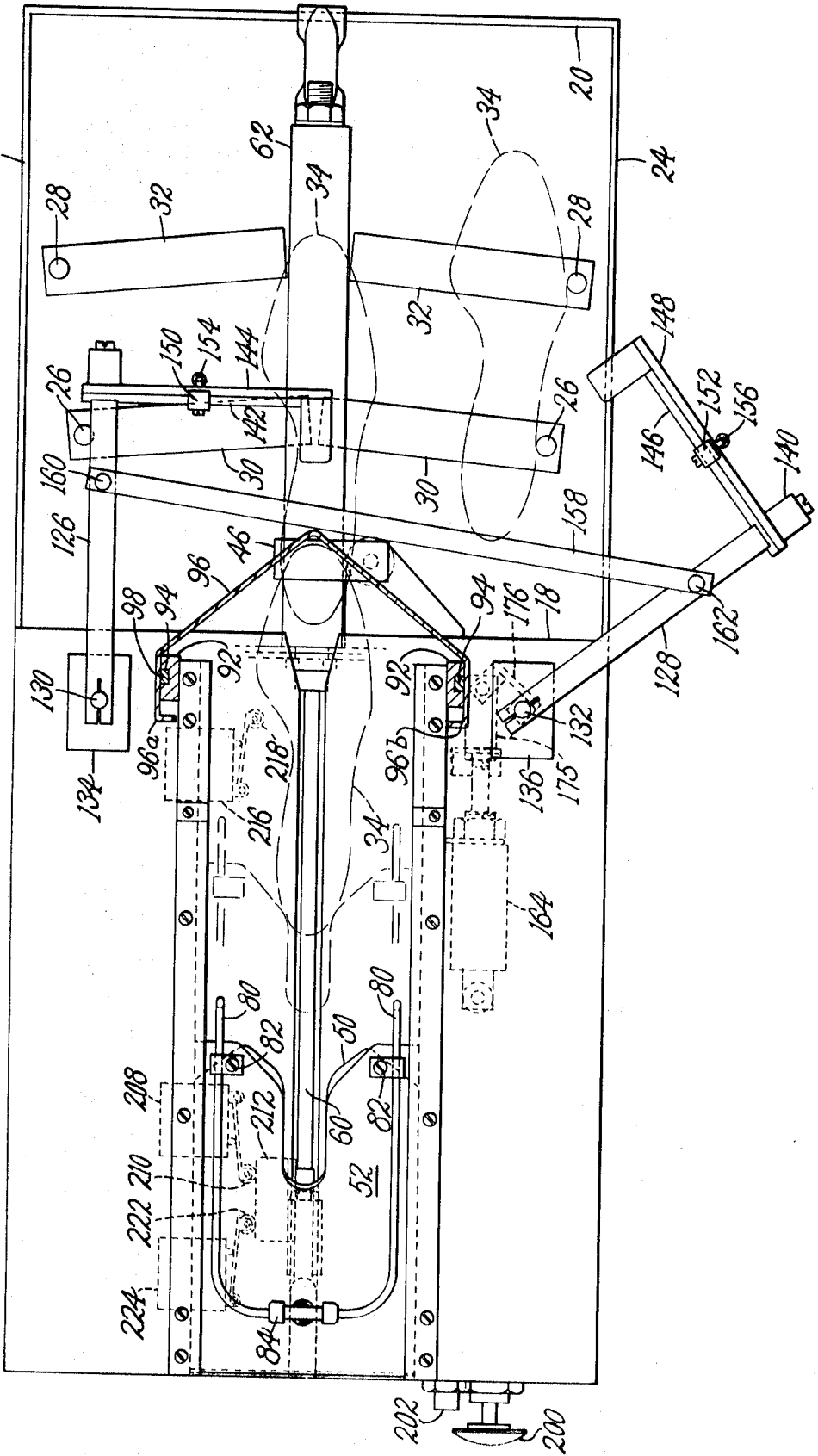
FIG. 2 is a partial plan view partly in section and with parts broken and other parts removed but otherwise corresponding with FIG. 1.
Figure 3:
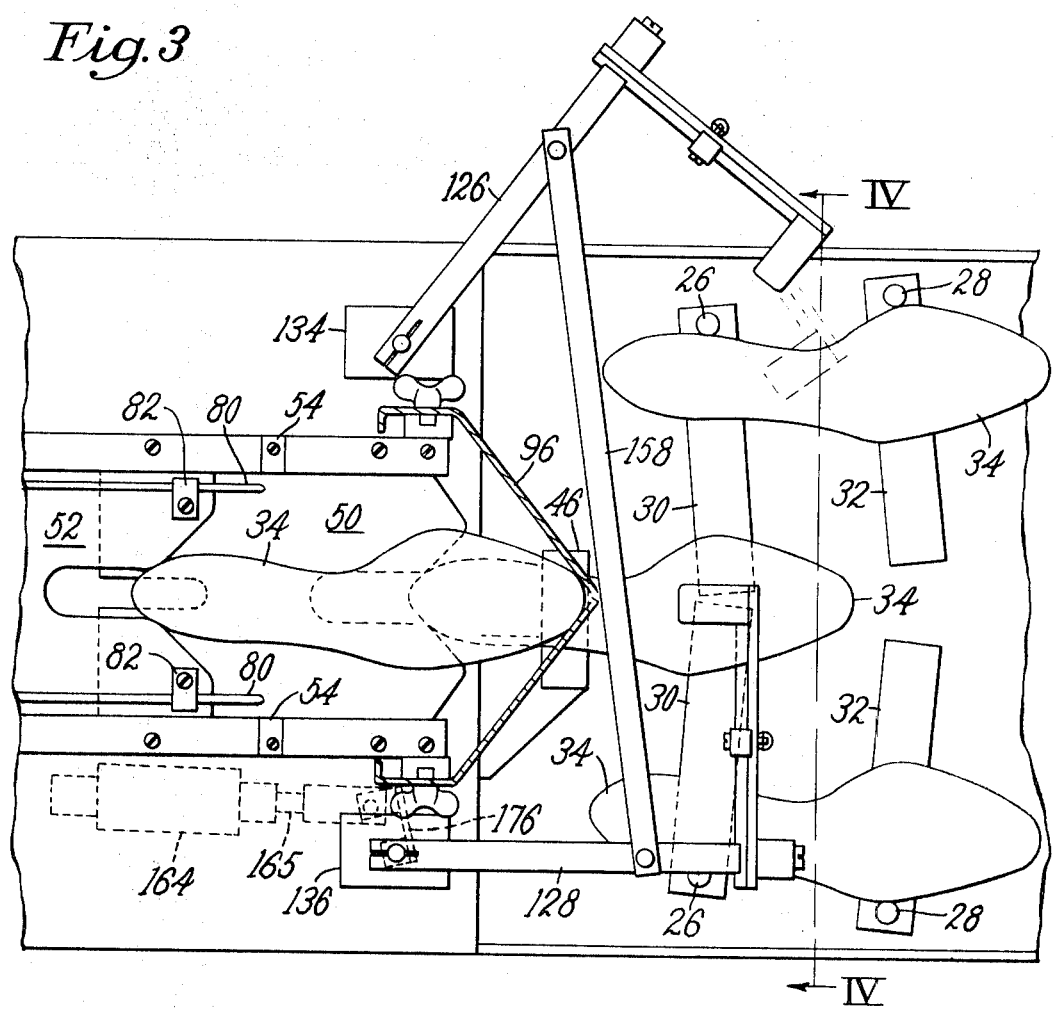
FIG. 3 is a partial plan view partly in section and with parts broken showing the machine in an intermediate operating position.
Figure 4:
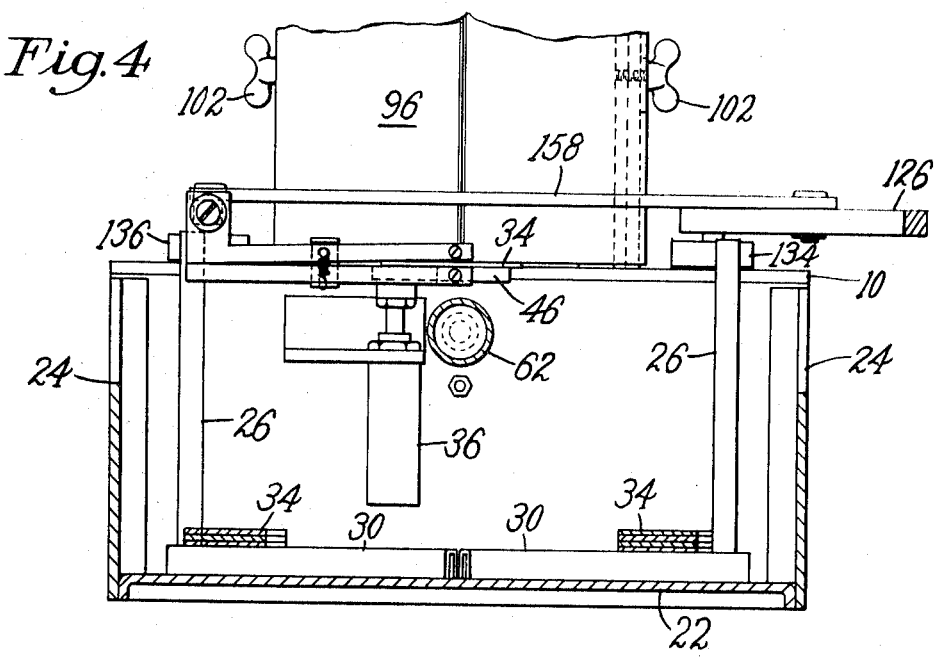
FIG. 4 is a partial sectional view partly in section and with parts broken viewed along the line IV—IV of FIG. 3.
Figure 5:
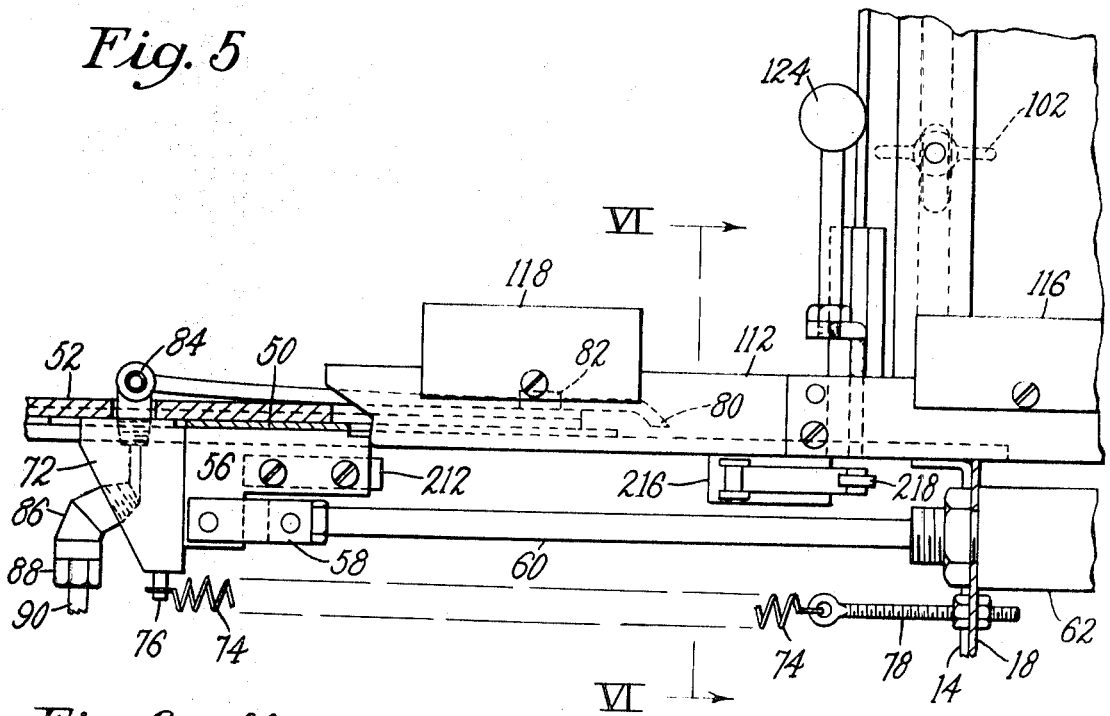
FIG. 5 is a partial front elevation partly in section and with parts broken showing the machine in the end, safety stop position.
Figure 6:
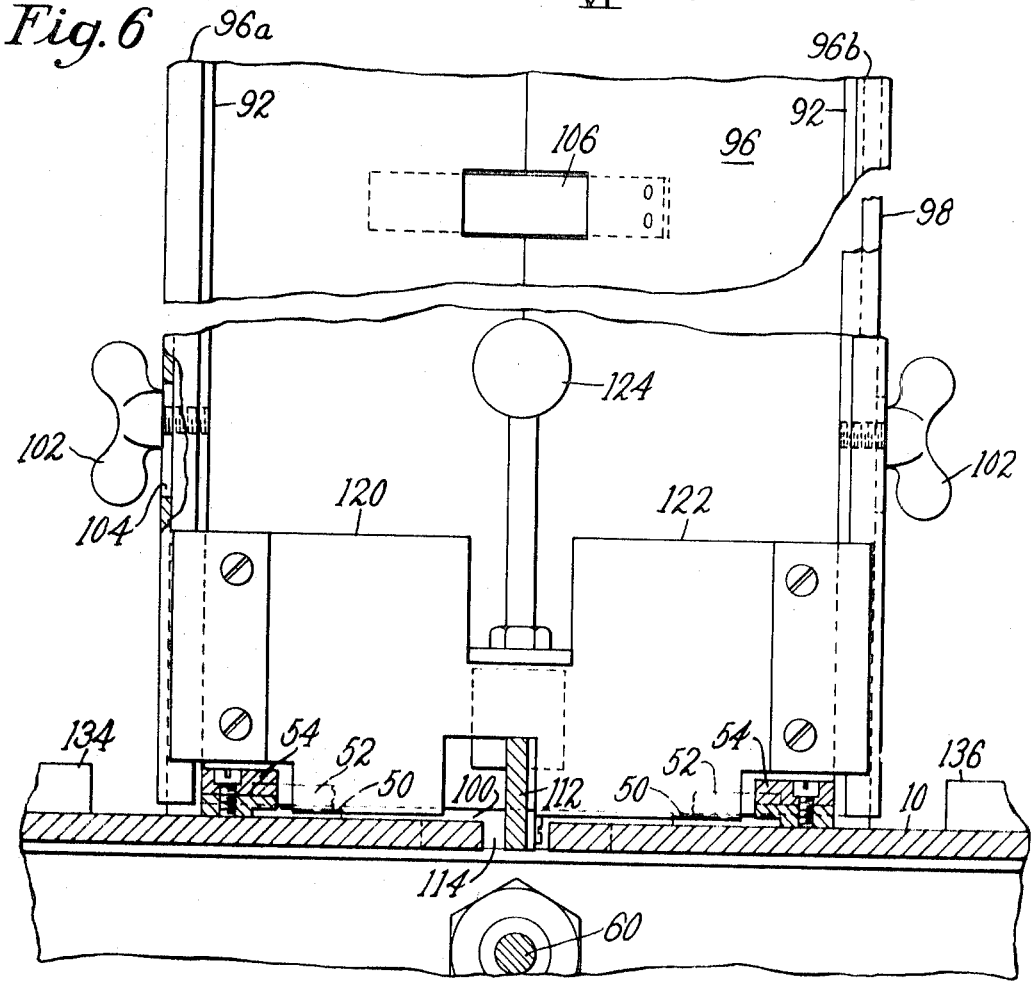
FIG. 6 is a sectional view with parts broken viewed along the line VI—VI of FIG. 5.
Figure 7:
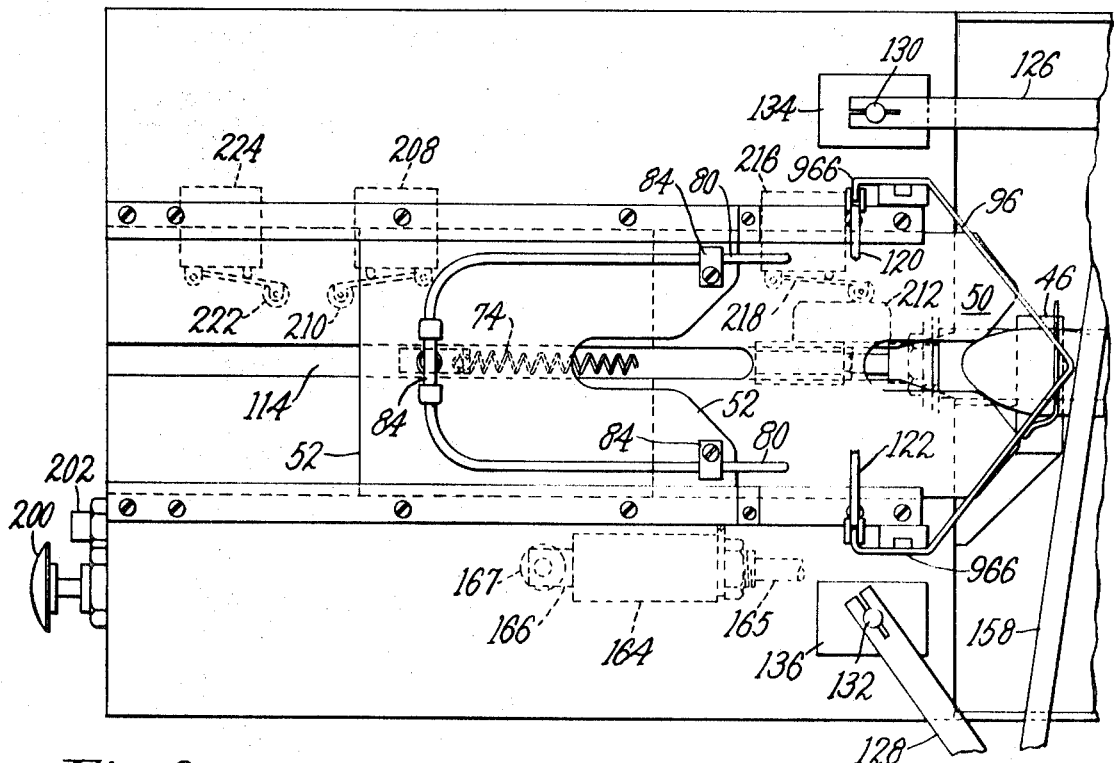
FIG. 7 is a partial plan view partly in section and with parts broken of the structure shown in FIG. 5.

FIGS. 1-7 are set up to show the machine in three stages of operation, specifically in relation to the mechanism for advancing a single sole from the starting stack. FIGS. 1 and 2 illustrate the machine in the initial or start position; FIGS. 3, 4 and 5 illustrate it with respect to an intermediate position, and, FIGS. 5, 6 and 7 illustrate it with respect to the final, stop, position, that is, after the starting stack of soles has become exhausted.

With reference now to FIGS. 1-7, the machine includes a support or table including a top 10 mounted on flanged end plates 12 and 14 which are in turn attached in an upright position relative to a base plate 16. A bin is attached to and extends from the table, the former comprising in attached relationship end plates 18 and 20, bottom plate 22 and side plates 24. The bin is provided with pairs of stripper rods 26 and 28 attached in upright position on mountings 30, 30 and 32, 32 which are attachably positioned on bottom plate 22. The mountings 30, 30 and 32, 32 serve also in pairs as separating or discharge sites for soles 34. Also located with respect to the bin is a pneumatic outsole jack comprising a cylinder 36 supported by a flange 38 attached to end plate 18. The cylinder 36 is attached to an air source, not shown, by means of coupling 40 and line 42 and is adapted to provide reciprocal motion to piston member 44 and support head 46 carried on the projecting end of piston 44. The support head 46 is adapted to be moved upward to support and spatially align a sole 34 when the latter is advanced to a position above it.

A pair of double track rails 48 are mounted on table top 10. The rails 48 are designed to facilitate travel of a lower, or sole advance plate 50 and a stack centering plate 52, and include stops 54 which restrict the travel of centering plate 52 to an intermediate point relative to that of the advance plate 50. Preferably, advance plate 50 has a thickness of less than that of a sole 34 to be separated, while centering plate 52 preferably has a thickness greater than that of a sole 34, and, accordingly is shown having a double thickness. The advance plate 50 and centering plate 52 have configurations at their advance ends, for example, angled slots are formed which facilitate centering of a sole 34 heel end with respect to the same, see FIGS. 2 and 3 specifically in that regard.

The advance plate 50 is attached to block 56, and the block in turn is attached to head 58 of piston member 60 which is mounted to be reciprocally moved by pneumatic cylinder 62. Cylinder 62 is attached through plates 14 and 18 and provided at either end with couplings 64 and 66 and air lines 68 and 70 respectively connected to an air source or sources, not shown, which serve to actuate cylinder 62 and provide reciprocal movement with respect to piston 60.

The centering plate 52 is attached to block 72. A tension spring 74 attached at one end by bolt 76 to block 72 and the other end by means of eye bolt 78 to plates 14 and 18 causes block 72 to follow in advance of block 56. Plates 50 and 52 are advanced together along rails 48 to the point where centering plate 52 strikes against stops 54. When piston member 60 directs block 56 to retreat carrying advance plate 50, block 56 urges block 72, and incidentally plate 52 in the same direction. Incidental to that spring 74 is stretched to provide it in a stretched or tensioned condition.

Centering plate 52 carries a pair of air jets 80 by means of attaching blocks 82. The air jets 80 are connected through T-joint 84 into a flexible air hose 86, which is in turn connected by means of coupling 88 and air line 90 to an air source, not shown. The air directed out through air jets 80 serves to keep the tracks 48 clear of particulate and other materials carried on or by the soles from a prior operation or operations.

A pair of upright posts 92 having keyways 94 are fixedly attached at the advance end of table top 10 see specifically FIG. 2. These serve to locate V-shaped gate 96, specifically through fitting of key members 98 secured to gate 96 into the key ways 94. Gate 96 is adapted to be raised and lowered in relation to table top 10 and thereby provide and define heightwise a feed opening 100 formed between the table top 10 and the bottom edge of the gate 96, see specifically FIG. 6. Adjustability in this respect is facilitated by the inclusion of adjustable wing bolts 102 fitted through slots 104. The gate 96 which may be of any convenient shape and height is provided effectively forward of the starting stack of soles 34. An opening 106 and spring 108 provided to the top of gate 96 form a latch arrangement for an inoperable setting for a stack leveler 110. The latch arrangement provides a position at which to rest the stack leveler 110 of soles 34 to be operated upon.

The stack leveler 110 includes a longitudinal platform 112 including a forward nose portion 112a adapted to fit into latch opening 106, and a rear or tail portion 112b adapted to fit into a slot 114 in table top 10, see specifically FIGS. 5 and 6. This latter arrangement serves as a stop for block 56 carrying advance plate 50 when a last sole 34 from the stack has been advanced, and, with the further result that the machine is made inoperable, until it is reset. The platform 112 carries a pair of leveling weights 116 and 118. In order for the leveler 110 to operate properly, it is designed to slide or drop downwardly on a gravitational basis as the stack diminishes. It is provided with a pair of bifurcated wing pieces 120 and 122, which slidably attach on inwardly turned end portions 96a and 96b, respectively of gate 96, see specifically FIGS. 6 and 7. The stack leveler 110 is also provided with a manual lifting and adjustment handle 124 attached to platform 112.

A pair of article separating arms 126 and 128 are mounted on pivotable shafts 130 and 132 respectively, to pivot relative to table top 10. A pair of shaft stabilizer bearing blocks 134 and 136 respectively are attached to upper surface of table top 10 with the shafts 130 and 132 passing through the same. Each of the arms 126 and 128 carry at their projecting ends article gripper members, attached by means of bolted studs 138 and 140 respectively and comprising in each case a pair of pivotally spring loaded jaw members 142 and 144 in one instance and 146 and 148 in the other. The spring loading is provided by clamp 150, 152 and spring 154, 156 arrangements respectively. Spring loading is adjusted to provide pressure across the jaws formed in each case by the jaw members so that a sole 34 directed by plate 50 may be conveniently thrust between the jaws and later stripped from the same, but at the same time hold the sole 34 while carrying it in an arcuate path between the loading position at a point intercepting the longitudinal axis of the machine and one of the discharge positions where it is stripped from the jaws, deposited and stacked.

The arms 126 and 128 are arranged to operate in sequence or on an alternating basis. A doubly pivotable bar 158 is provided for this purpose, the same being attached by pivot pin 160 to arm 126 and pivot pin 162 to arm 128. This arrangement also allows one arm 128 to be powered and the other arm 126 to be enslaved.

Figure 8:
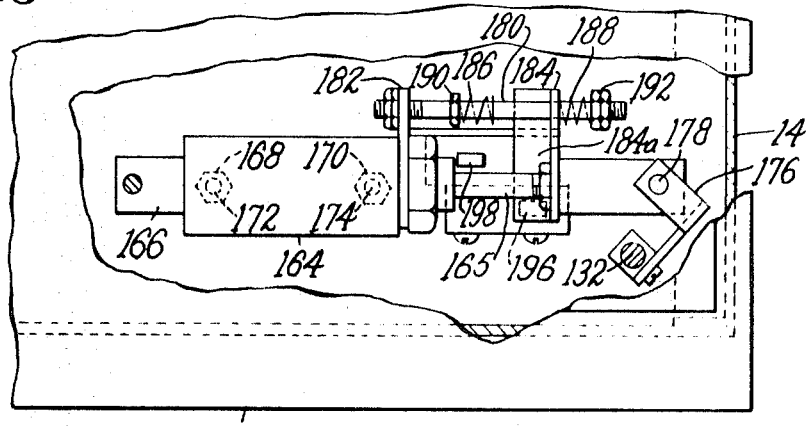
FIG. 8 is a partial plan view partly in section and with parts broken showing in enlargement the drive mechanism for the powered pivotable arm.
Figure 9:
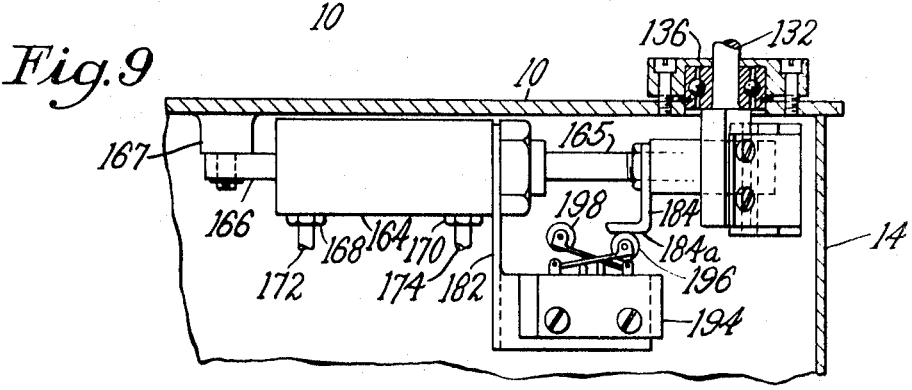
FIG. 9 is a partial side elevation partly in section and with parts broken of the construction shown in FIG. 8.

A reciprocating pneumatic cylinder 164 and piston 165 are used to operate powered arm 126. The cylinder 164 is fixedly hung from the bottom side of table top 10 by means of a coupling 166 and hanger 167. The cylinder 164 is connected to an air source, not shown, by means of couplings 168, 170 and hoses 172 and 174 respectively. The piston member 165 is connected through a link 175 and bell crank 176 to pivotable shaft 132 for powered arm 128. Pin 178 pivotally attaches the bell crank 176 to piston link 175, while the attachment to shaft 132 is fixed in nature. The cylinder 164 and piston member 165 are provided with a mechanism by which to dampen the arcuate movement of separator arms 126 and 128 at either end of their respective axes. This is shown specifically at FIGS. 8 and 9. A bar 180 is carried slidably by a flanged arm 182 attached to the forward end of cylinder 164 and a flanged arm 184 secured onto piston member 165. A pair of damping springs 186 and 188 and a pair of stops 190 and 192, respectively, for the springs are carried on the bar 180. That arrangement is extended to provide a double switching mechanism by which to actuate the cylinder 164 in a reciprocating manner. To effect that, flange arm 182 carries switch box 194 including a pair of trip arms 196 and 198 in spaced relationship. The trip arms are depressed in an alternate or reciprocal fashion by camming surface 184a of arm 184 as it contacts the trip arms on being reciprocated as the result of similar action by piston rod 165.

Figure 10:
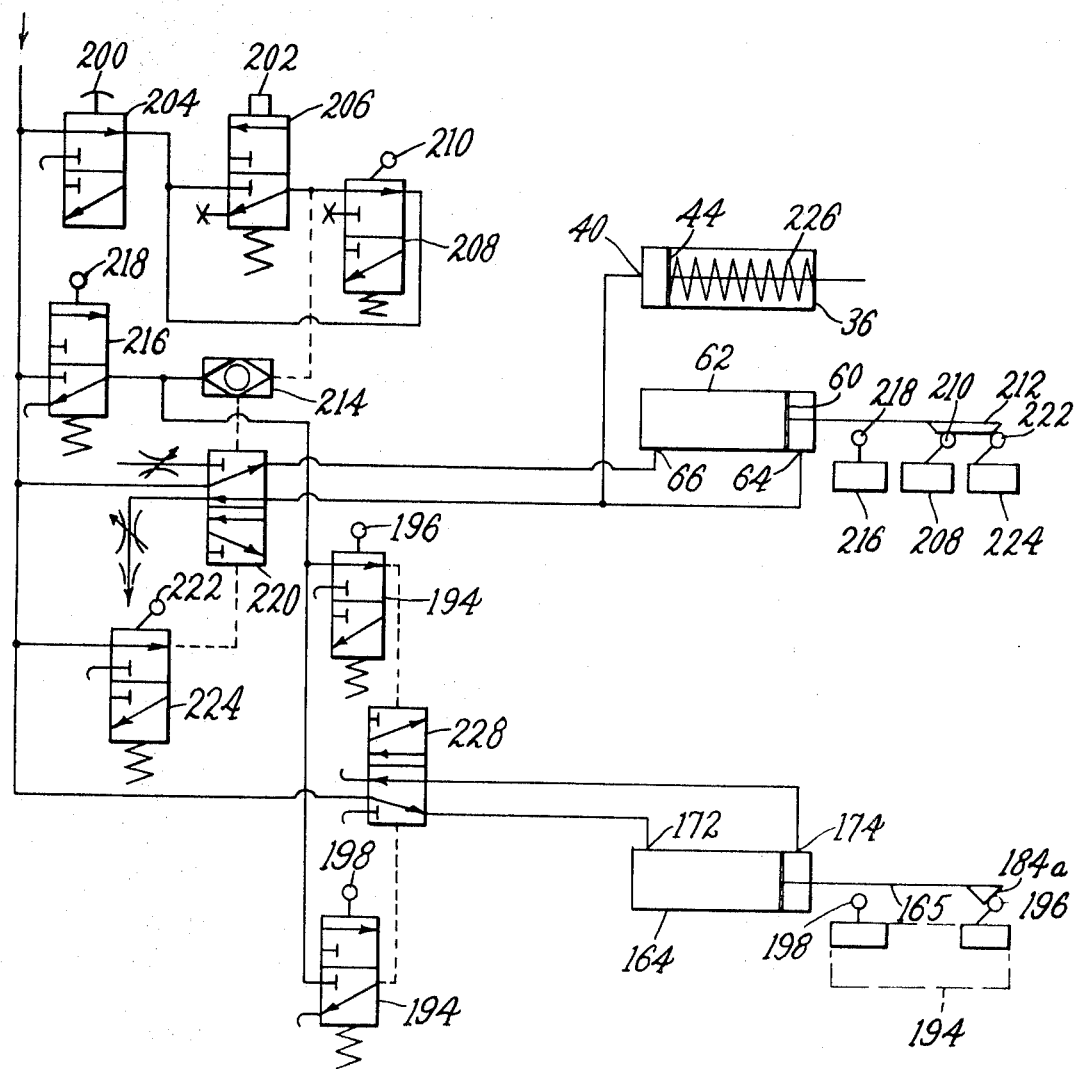
FIG. 10 is a schematic view of the control system for the machine.

The machine is provided with a start button 200 and a reset button 202 by which to initiate the pneumatic system and actuate the machine. Air for the system is provided from a source, not shown. These together with other pneumatic control and circuitry members may be considered in conjunction with the diagram of FIG. 10. Start button 200 engages a valve 204, while button 202 engages valve 206. Valves 204 and 206 are interconnected by air lines into cycle stop limit valve 208 which includes a trip arm 210 that registers on cam surface 212 carried on block 56 that attaches to advance plate 50. Valve 208 actuates shuttle valve 214 in one direction depending upon whether or not trip arm 210 is depressed by cam surface 212. Shuttle valve 214 is moved in the opposite direction in response to valve 216, and specifically as a result of trip arm 218 being depressed by cam surface 212. With valves 208 and 216 so effecting shuttle valve 214 air passes through four-way valve 220 and enters cylinder 62 through valve 66 and urges piston 60 accordingly to an extent position and causing both of plates 50 and 52 to be retracted or start position. With piston 60 fully extended trip arm 222 of valve 224 is depressed by cam surface 212 and the air passed through four-way valve 220 and through coupling 64 into cylinder 62 to urge piston 60 in the opposite or retracted position and causing plates 50 and 52 to be advanced. Simultaneously with air being introduced to urge the piston 60 to the retracted position, air from the four-way valve 220 also enters sole jack cylinder 36, through coupling 40 causing member 44 to extend and raise support head 46. Retraction of piston 44 is based on extension of spring 226 carried to within sole jack cylinder 36.

The separating arms 126 and 128 are actuated by pneumatic cylinder 164, as previously indicated. When the cam surface 184 depresses trip arm 198 of valve 194 air from four-way valve 228 enters cylinder 164 through entry port 172 where it urges piston 165 to the extended position. Toward the end of that stroke the cam surface 184a depresses trip arm 196 of valve 194 causing the air from the four-way valve 228 to enter the cylinder 164 through entry valve 174, where it urges piston 165 to the retracted position.

In order for one or the other of separating arms 126 and 128 to be brought into loading position, essentially on the longitudinal axis of the machine, at a time for the sole advance plate 50 to thrust a sole 34 between the jaws of same, some timing is necessary. This is primarily set with respect to the advance plate 50, and more specifically relative to the pneumatic cylinder 62, which actuates the same. When feed piston rod 60 is retracted, the advance plate 52 advances to a sole 34 and directs the same through feed opening 100 in gate 96. Previous to that then one or the other of arms 126 and 128 and more specifically the jaws of same must be in the loading position. This is effected by timing based on values 216 and 224 which determine whether air is to be directed into either intake valve 172 or intake 174 serving to urge piston rod 165 accordingly.

The machine of this invention is adapted to operate automatically. The operator after setting the advance plate 50 and centering plate 52 in the retracted position, and locating the stack leveler 110 in the latch opening 106 of gate 96 simply places an initial stack of soles 34 in pairs to be separated, to lefts and rights, into the machine with their toes against the gate 96. The leveler 110 is then released from latch opening 106 and placed on the stack of soles 34. The feed opening 100 between gate 96 and table top 10 is checked and if needed is adjusted heightwise to allow only a single sole 34, to pass through same in a single pass. The operator then pulls starting button 200, to activate the pneumatic system. The machine operates automatically from there with soles 34 being advanced singly by advance plate 52, through feed opening 100 where they are picked up and stacked alternately in separate stacks by separating arms 126 and 128. Operation may be continued until the initial stack becomes exhausted. After the last sole has been advanced the stack leveler 110 drops into the slot 114, preventing the machine to be further operated until reset.

It will thus be seen that the objects set forth above, including those made apparent from the preceding description are efficiently attained and, since certain changes may be made in the above constructions without departing from the scope of the invention, it is intended that all matter contained in the above description or shown in the accompanying drawing shall be interpreted as illustrative and not in a limiting sense.

Having thus described our invention what we claim as new and desire to secure by Letters Patent of the United States is:

1. A machine adapted to automatically separate articles from a starting stack of the articles into two separate stacks on an alternate basis comprising article advancing means for advancing articles in a longitudinal path singly from the starting stack, separating means comprising a pair of arms pivotably mounted about spaced vertical axes, each arm being provided with article gripper means for releasably gripping articles moving along said longitudinal path of advance and adapted to arcuately travel in a horizontal plane and transfer said articles on an alternate basis to opposed laterally spaced stacking positions, means for moving said pair of arms about their said pivot axes, and article stripper means positioned effectively within the travel arc of each of said pivotable arms and above said laterally spaced stacking positions for stripping articles from said gripper means so the articles fall and are stacked therebelow.

2. A machine according to claim i wherein the means for advancing the articles from the starting stack is a reciprocally movable plate which advances the bottom article in the starting stack.

3. A machine according to claim 2 wherein a gate means is provided in the direction of advance of the articles from the starting stack, the gate defining an opening having a height dimension through which only a single article can pass at one time.

4. A machine according to claim 1 wherein the pivotable arms are interconnected through a doubly pivotable connecting member.

5. A machine according to claim 1 wherein the article gripper members include spring loaded jaws which are adapted to be forced apart by an article directed into same by the article advancing means.

6. A machine according to claim 1 wherein the stripper means includes separate abutment members spaced apart a distance less than the effective length of the article presented to the same by the article gripper means.